(No Model.)

W. H. FLINN.
DOOR KNOB ATTACHMENT.

No. 299,633. Patented June 3, 1884.

Witnesses
P. J. Noyes.
John F. C. Prenkert

Inventor:
William H. Flinn.
by Crosby & Gregory
attys.

UNITED STATES PATENT OFFICE.

WILLIAM HENRY FLINN, OF NASHUA, NEW HAMPSHIRE.

DOOR-KNOB ATTACHMENT.

SPECIFICATION forming part of Letters Patent No. 299,633, dated June 3, 1884.

Application filed July 30, 1883. (No model.)

*To all whom it may concern:*

Be it known that I, WILLIAM H. FLINN, of Nashua, county of Hillsborough, State of New Hampshire, have invented an Improvement in Door-Knobs, of which the following description, in connection with the accompanying drawings, is a specification, like letters on the drawings representing like parts.

Door-knobs composed of a spindle, knobs, and an attached neck as now commonly made are adapted to doors of different thickness by means of two screws—one in a single hole in each neck—which screws enter threaded holes at opposite ends of the spindle, said spindle at one end commonly having two, and at the other end three, screw-holes, which are made therein at right angles to the longitudinal center of the spindle, they affording three changes of position or shifts—two of one-fourth inch each at one end, and one of one-half inch at the other end; and to take up play or lost motion the said spindle is commonly provided with a series of washers, a greater or less number of which may be used as needed; yet with two screws and five screw-holes in the spindle and with one screw-hole in each shank a sufficient number of adjustments cannot be had to adapt the common knob to the varying thickness of doors commonly met with. To obviate the employment of washers, and at the same time obtain greater latitude for adjustment of the knob, I provide the knob-shank with two or more screw-holes at opposite sides, but at different distances from its end, two of the said holes being made in the shank at one side, and the other one at the opposite side of the shank, and at a point preferably intermediate the two holes, all three of the said holes thus being at different distances from the end of the shank, and by the employment of but one screw with each shank and but one threaded hole in the spindle I am enabled to effect more and finer adjustments than heretofore, and by providing the spindle with more than one hole at each end, or with one hole made therein at an angle to its longitudinal center, I am enabled to yet further increase the number of shifts, and by increasing the number of the diagonally-placed holes in the spindle I can yet further increase the number of shifts.

Figure 1:
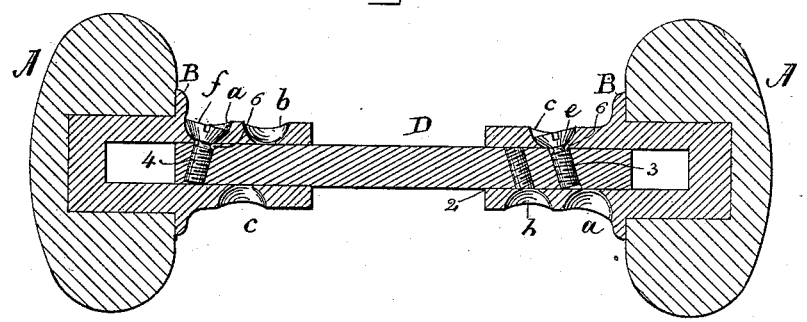
Figure 2:
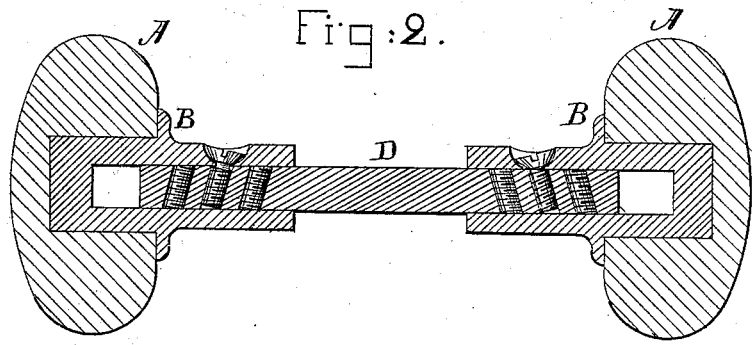

Figure 1, in longitudinal section, represents a knob containing my improvements; and Fig. 2, a modification thereof, wherein the shank has but one screw-hole and screw to co-operate with the diagonally-placed holes.

Referring to the drawings, the hand-pieces A are attached, as usual, to the shanks B. In Fig. 1 each shank is provided with three screw-holes, *a b c*, the two *a b* being in line at one side and about half of an inch apart, and that *c* between the other two, but at the opposite side of the shank, thus leaving hole *c* at a different distance with relation to the end of the shank than either of the holes *a b*. For cheapness of construction, these holes will be formed by casting when the shank is cast.

In Fig. 1 the right-hand end of the shank D is shown as provided with two screw-holes, 2 3, and the left-hand end with but one hole, 4, and the said holes are shown as bored diagonally with relation to the longitudinal center or axis of the spindle D, and as threaded to receive the two screws *e f*. With three holes in each shank instead of but one, as heretofore, and with but one screw-hole at each end of the spindle, and with even the screw-hole at right angles to the axis of the spindle, six variations in length of knob-spindle may be secured, which are more than can be made by the screws alone in the common spindle referred to; but to yet further increase the range of adjustment of the knob-spindle as to length, I am enabled with but one hole at each end thereof, but that an inclined or diagonal hole, as in the drawings, to enable each hole to effect two positions rather than one position— as, for instance, if the screw *f* in Fig. 1 is removed from the diagonal or inclined hole 4 and hole *a* in the shank, and the knob and shank are removed from the spindle and reversed, the said screw may be made to enter the same hole *a* in the shank and the other end of the threaded hole 4, which will place the knob and spindle in a different position with relation to each other. The last position referred to of the shank and spindle would place the knob farthest out from the center of the spindle. The position shown at the left of Fig. 1 would be the second position. A third position would be with the screw in hole *c* and the end of hole 4 nearest the left-hand end of the spindle; a fourth position with the said screw in hole c and in that end of hole 4 farthest from the end of the spindle; a fifth position with the screw in hole b and that end of hole 4 nearest the spindle, and a sixth position with the said screw in hole b and in that end of hole 4 farthest from the end of the spindle. Providing the shank at opposite sides with holes b c at different distances from its end is a matter of very considerable importance, and greatly aids in increasing the number of adjustments over what would be possible if the shank had but one screw-hole, as common in knobs, and by placing two screw-holes at opposite sides of the shank and at different distances from the end of the shank, rather than two at one side only, I am enabled to make the holes more nearly in the same line, thus making the adjustment finer.

The screw-holes in the shank do not need to be threaded, as do the screw-holes in the spindle, and hence a knob the shank of which has two or more screw-holes is cheaper to make than a knob having two or more or the same number of threaded holes in the spindle. By making additional diagonal holes in the spindle more adjustments are provided for.

In Fig. 2 I have shown both ends of the spindle as provided with three diagonal holes, and each shank with but one screw, and in such plan it is possible to effect twelve different positions of knob and spindle. Should I provide each shank in Fig. 2 with three holes instead of one, my invention would be yet further extended. It will be noticed (see screw f, Fig. 1) that it is provided with an annular notch, 6, just below its head. This notch, by engaging the edge next the spindle of the countersunk hole in the shank as the screw is turned home, acts to set the screw and prevent it from working out by the mere act of turning the knob, as is now common with ordinary knobs.

I claim—

1. A knob-spindle provided with a screw-threaded diagonal hole combined with a knob-shank provided with a screw-hole, whereby by a partial rotation of the knob-shank on the knob-spindle the hole in the shank may be placed opposite either of the two ends of the hole made diagonally through the spindle, to enable a screw inserted through the hole in the shank and into one or the other end of the same diagonal hole to alter the effective length of the knob-shank, substantially as described.

2. The spindle having a diagonally-placed threaded hole and a screw combined with a knob-shank having holes at opposite sides thereof and at different distances from its end, as and for the purposes set forth.

In testimony whereof I have signed my name to this specification in the presence of two subscribing witnesses.

WILLIAM HENRY FLINN.

Witnesses:
J. G. KIMBALL,
W. A. FARLEY.